(12) United States Patent
Rogers

(10) Patent No.: US 9,458,031 B2
(45) Date of Patent: Oct. 4, 2016

(54) THERMO-REVERSIBLE PHASE SELECTIVE XEROGEL COMPOSITIONS

(71) Applicant: Rutgers, The State University of New Jersey, New Brunswick, NJ (US)

(72) Inventor: Michael Rogers, Hamilton, NJ (US)

(73) Assignee: RUTGERS, THE STATE UNIVERSITY OF NEW JERSEY, New Brunswick, NJ (US)

(*) Notice: Subject to any disclaimer, the term of this patent is extended or adjusted under 35 U.S.C. 154(b) by 213 days.

(21) Appl. No.: 14/100,136

(22) Filed: Dec. 9, 2013

(65) Prior Publication Data

US 2014/0163258 A1  Jun. 12, 2014

Related U.S. Application Data

(60) Provisional application No. 61/735,731, filed on Dec. 11, 2012.

(51) Int. Cl.
| | |
|---|---|
| *C07C 59/00* | (2006.01) |
| *C02F 1/28* | (2006.01) |
| *C09K 3/32* | (2006.01) |
| *C02F 1/40* | (2006.01) |
| *C02F 101/32* | (2006.01) |
| *C02F 103/00* | (2006.01) |
| *C02F 103/08* | (2006.01) |

(52) U.S. Cl.
CPC ............ *C02F 1/285* (2013.01); *C09K 3/32* (2013.01); *C02F 1/40* (2013.01); *C02F 2101/32* (2013.01); *C02F 2103/007* (2013.01); *C02F 2103/08* (2013.01); *C02F 2303/16* (2013.01)

(58) Field of Classification Search
USPC ........................................................ 554/213
See application file for complete search history.

(56) References Cited

PUBLICATIONS

Rodgers et al., "Engineering the oil binding capacity and crystallinity of self-assembled fibrillar networks of 12-hydroxystearic acid in edible oils", Soft Matter, vol. 4, pp. 1483-1490, 2008.*
Mallia, et al. "Robust Organogels from Nitrogen-Containing Derivatives of (R)-12-Hydroxystearic Acid as Gelators: Comparisons with Gels from Stearic Acid Derivatives." Langmuir 25(15): 8615-8625. (2009).*

* cited by examiner

*Primary Examiner* — Deborah D Carr
(74) *Attorney, Agent, or Firm* — Fox Rothschild LLP

(57) ABSTRACT

Described herein are xerogels consisting essentially of 12-hydroxy-stearic acid (12-HSA) wherein the xerogel is characterized by a spherulitic fibrillar network structure. Also provided is a method for adsorbing an apolar liquid by contacting a 12-HSA xerogel composition with the apolar liquid.

8 Claims, 6 Drawing Sheets

THERMO-REVERSIBLE PHASE SELECTIVE XEROGEL COMPOSITIONS

CROSS REFERENCE TO RELATED APPLICATION

This application claims priority to U.S. Provisional Application Ser. No. 61/735,731, which was filed on Dec. 11, 2012, the disclosure of which is incorporated herein by reference.

BACKGROUND

Waterways are a major mode of transport for the world's petrochemical supply. Although there are tremendous benefits and necessities for shipping over water, there are also risks as witness by the over 30 significant oil spills (i.e., >7000 tons of crude released per incident) since 2000. (Huijer, K. *Trends in Oil Spills from Tanker Ships*. 2012 [cited 2012 Sep. 25, 2012]; Available from: http://www.itopf.com/_assets/documents/amop05.pdf).

Confounding the issue, underwater exploration and offshore drilling increase the risks of petrochemicals entering our waterways as was observed in 2010 when nearly 5 billion barrels of crude oil were released in the Gulf of Mexico. (Hoch, M. *New Estimate Puts Gulf Oil Leak at 205 Million Gallons,* [2012 on Sep. 25, 2012]; Available from http://www.pbs.org/newshour/rundown/2010/08/new-estimate-puts-oil-leak-at-49-million-barrels.html). Each incident has a devastating effect on Earth's delicate ecosystems. The presence of both crude oil and the chemical dispersants used to disperse the oil can disrupt sensitive food webs and create situations of bioaccumulation where toxins progressively climb up trophic levels of a food chain.

Current materials used to reclaim oil are subdivided into three primary categories including: dispersants, sorbents and solidifiers. (Jadhav, R. S., et al., *Sugar-Derived Phase-Selective Molecular Gelators as Model Solidifiers for Oil Spills*. Angewandte Chemie, 2010. 49: p. 7695-7698). Dispersants are most commonly used where the material emulsifies the oil spill into small finely divided droplets which are dispersed into the environment. (Lessard, R. R. and G. DeMarco, *The Significance of Oil Spill Dispersants*. Spill Science & Technology Bulletin, 2000. 6: p. 59-68; and Chapman, H., et al., *The use of chemical dispersants to combat oil spills at sea: A review of practice and research needs in Europe*. Marine Pollution Bulletin, 2007. 54: p. 827-838). Sorbents are typically powders that selectively adsorb the oil via capillary forces of the super-hydrophobic matrix. (Yuan. J., et al., *Superwetting nanowire membranes for selective absorption*. Nature Nanotechnology, 2008. 3: p. 332-336; Thanikaivelan, P., et al., *Collagen based magnetic nanocomposites for oil removal applications*. Scientific Reports, 2012. 2; p. 230-237; Karakutuk, I. and O. Okay, *Macroporous rubber gels as reusable sorbents for the removal of oil from surface waters*. Reactive & Functional Polymers, 2010. 70: p. 585-595). Solidifiers gel the material on the surface of the water using either polymeric or monomeric gelators. (Jadhav, R. S., et al., *Sugar-Derived Phase-Selective Molecular Gelators as Model Solidifiers for Oil Spills*. Angewandte Chemie, 2010. 49: p. 7695-7698; Basak, S., J. Nanda, and A. Banerjee, *A new aromatic amino acid based organogel for oil spill recovery*. Journal of Materials Chemistry, 2012. 22: p. 11568-11664; Mallia, V. A. and R. G. Weiss, *Low molecular weight gelators for crude oil, petrolium product or chemical spill containment*, 2012). Ideally, any material used to treat spilled oil in our waterways must selectively remove the oil phase from water, be environmentally benign, allow oil to be reclaimed and the material should be recyclable or reusable. (Jadhav, R. S., et al., *Sugar-Derived Phase-Selective Molecular Gelators as Model Solidifiers for Oil Spills*. Angewandte Chemie, 2010. 49: p. 7695-7698). Recently, there has been a surge in research interest in utilizing amphiphilic solidifiers based on numerous molecular gelators including: sugar alcohols, (Jadhav, R. S., et al., *Sugar-Derived Phase-Selective Molecular Gelators as Model Solidifiers for Oil Spills*. Angewandte Chemie, 2010. 49: p. 7695-7698) amino acid amphiphiles, (Bhattacharya, S. and Y. Krishnan-Ghosh, *First report of phase selective gelation of oil from oil/water mixtures. Possible implication toward containing oil spills*. Chemical Communication, 2001: p. 185-186) aromatic amino acids, (Basak, S., J. Nanda, and A. Banerjee, *A new aromatic amino acid based organogel for oil spill recovery*. Journal of Materials Chemistry, 2012. 22: p. 11568-11664) and modified 12-hydroxy-N-alkyloctadecanamide. (Mallia, V. A. and R. G. Weiss, *Low molecular weight gelators for crude oil, petrolium product or chemical spill containment*, 2012.) Although this is a promising technology there are practical drawbacks, which involve the kinetics and thermodynamics of gelation on such extensive scales. For example, when applying the gelator over large areas, dilution of the gelator may prevent solidification. Therefore, a need exists for alternative materials and methods for remediating oil and other chemical spills.

SUMMARY

There is provided in accordance with various embodiments a xerogel consisting essentially of 12-hydroxy-stearic acid (12-HSA), wherein the xerogel is characterized by a spherulitic fibrillar network structure. In another embodiment, the network structure of the xerogel is established in an acetonitrile molecular 12-HSA gel. In yet another embodiment, the xerogel is used to remediate crude oil spills and spills of products refined from crude oil.

Also provided is a method for adsorbing an apolar liquid by contacting a xerogel composition that includes 12-HSA with the apolar liquid. In one embodiment, the apolar liquid is selected from alkanes, amines, ethers, nitriles, and combinations thereof. In yet another embodiment, the apolar liquid is a refined crude oil product. In one embodiment, the refined crude oil product is selected from motor oil, diesel fuel, and gasoline. In a further embodiment, the apolar liquid is in an aqueous medium. In yet another embodiment, the xerogel composition applied to the apolar liquid is present in an amount that is about ⅕ the volume of the apolar liquid.

In an additional embodiment, the 12-HSA xerogel composition used in the adsorption method is prepared by a method that includes the steps of: (a) combining 12-HSA and acetonitrile to form a solution of 12-HSA in the acetonitrile; (b) allowing the solution of step (a) to form a gel; and (c) removing acetonitrile from the gel of step (b) to form the xerogel composition. In one embodiment, the amount of 12-HSA in acetonitrile in step (a) ranges from about 0.5 wt % to about 15 wt % based upon the total weight of 12-HSA and acetonitrile.

Also presented is a method for reclaiming petroleum or a petroleum-based liquid from a xerogel composition that includes 12-HSA and petroleum or a petroleum-based liquid, the method includes the steps of heating the xerogel composition to melt the 12-HSA and extracting the melted 12-HSA from the composition. In one embodiment, the extracting step includes solid phase extraction. In another embodiment, the extracting step includes methyl chloride extraction.

DETAILED DESCRIPTION

As used in this document, the singular forms "a," "an," and "the" include plural references unless the context clearly indicates otherwise. Unless defined otherwise, all technical and scientific terms used herein have the same meanings as commonly understood by one of ordinary skill in the art. As used in this document, the tem "comprising" means "including, but not limited to."

Figure 1:
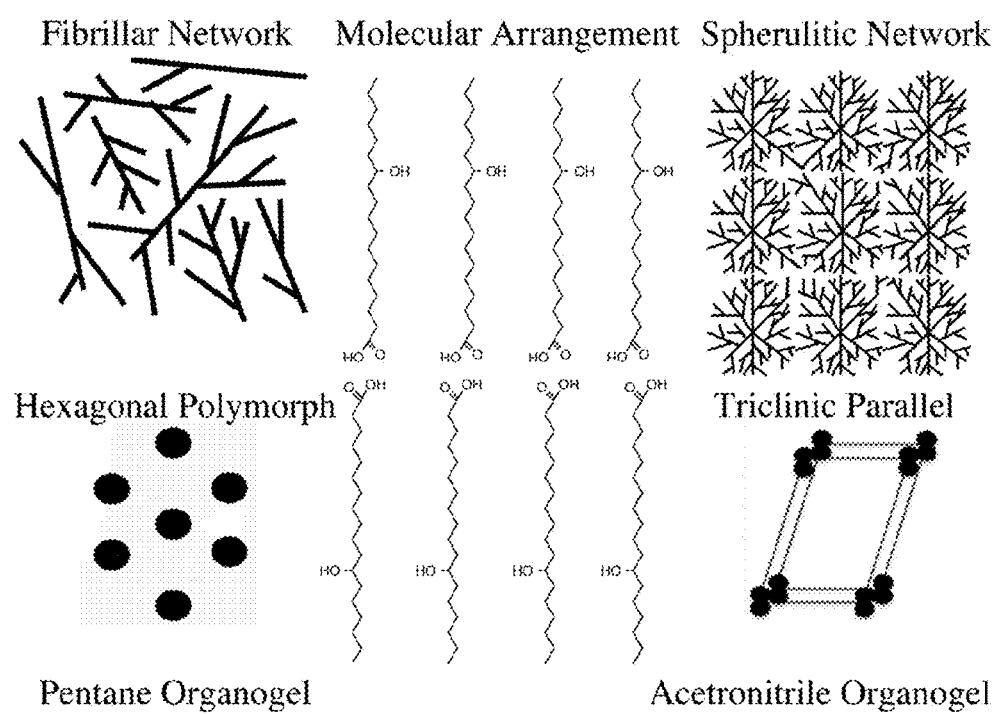
FIG. 1 provides a schematic representation of the different polymorphic nanoscale interactions found in 12-HSA-pentane and 12-HSA-acetonitrile organogels.

This document describes xerogels consisting essentially of 12-hydroxy-stearic acid (12-HSA), wherein the xerogel is characterized by a spherulitic fibrillar network structure. In one aspect, the network structure of the xerogel is established in an acetonitrile molecular 12-HSA gel. Xerogels formed using 12-HSA and acetonitrile are highly effective sorbent materials capable of adsorbing apolar, spilled materials in aqueous environments. 12-HSA organogels in acetronitrile are highly effective at producing xerogels, capable of adsorbing spilled oil, because of the highly branched (e.g. spherulitic) fibrillar networks established in acetonitrile molecular gels. (FIG. 1.) These xerogels, being thermoreversible, allow both the spilled oil to be reclaimed but also the gelator can be reused to engineer new xerogels for oil spill containment and clean up.

This document also describes methods for preparing xerogel compositions by combining 12-HSA and acetonitrile to form a solution of 12-HSA in acetonitrile; allowing the solution to form a gel; and removing acetonitrile from the gel to form the xerogel composition. An optional step includes heating 12-HSA and the acetonitrile to form the solution.

In a preferred embodiment, the amount of 12-HSA in the acetonitrile ranges from about 0.5 wt % to about 15 wt % based upon the total weight of 12-HSA and acetonitrile. Additional preferred ranges of 12-HSA are from about 0.5 wt % to about 10 wt %; from about 0.5 wt % to about 5 wt %; or an amount less than about 5 wt %. All percentages are based upon the total weight of 12-HSA and acetonitrile.

As used in this document, the terms "xenogel" and "xerogel" refer to the product obtained when solvent contained in an organogel is evaporated. Either term describes a dry gel with a matrix formed by fibers of an organogelator. The term "organogelator" refers to an organic molecule capable of gelling, in small proportions, a variety of organic solvents. Also as used herein, the term "organogel" refers to the gel formed by the organogelator and the solvent or liquid (to which the organogelator is added). This organogel can be viscous, semi-solid or in the form of an immobilized liquid.

As used herein, the term "consisting essentially of", with respect to the components of a xerogel consisting essentially of 12-HSA, wherein the xerogel is characterized by a spherulitic fibrillar network structure, means the xerogel contains the indicated components in a spherulitic fibrillar network structure, and may contain additional components provided that the additional components do not destroy the spherulitic fibrillar network structure or impair the xerogel's ability to function as an adsorbent material.

Also presented are xerogel compositions prepared according to the methods of the present invention.

This document also describes methods for adsorbing an apolar liquid by contacting a xerogel composition of the present invention with an amount of the apolar liquid. Apolar liquids include, but are not limited to, alkanes, amines, ethers, nitriles, and the like. Apolar liquids also include crude oil of essentially any classification or composition, as well as refined crude oil products, which include, but are not limited to, motor oil, diesel fuel, gasoline, and the like. In one embodiment, the apolar liquid to be adsorbed is in an aqueous medium (e.g. waterway, ocean, lake, river, stream, creek, etc.) when contacted with the xerogel composition. In another embodiment, the apolar liquid to be adsorbed is not in an aqueous medium. For example, the liquid is present (e.g. spilled) on a solid surface (e.g. roadway, parking lot, etc.). Preferably, the xerogel is applied to the apolar liquid in an amount that is about ⅓ the volume of liquid (e.g. spill volume). Amounts less than or greater than this amount can also be applied to the liquid. For example, if an amount of the apolar liquid has not been adsorbed following a first application of xerogel, a second (or additional—third, forth, etc.) application of xerogel (in an amount less than, greater than, or equal to ⅓ the volume of liquid) can be contacted with the remaining liquid.

Xerogels formed using 12-HSA and acetonitrile are highly effective sorbent materials that adsorb apolar, spilled materials in aqueous environments. These xerogels, being thermoreversible allow the spilled petroleum or petroleum-based liquid to be reclaimed and also the gelator (e.g. 12-HSA) can be reused to engineer new xerogels for oil spill containment and clean up. Therefore, also presented are methods for reclaiming petroleum or a petroleum-based liquid from a xerogel composition described herein which further includes petroleum or a petroleum-based liquid. The method includes the steps of heating the xerogel composition to melt the 12-HSA and extracting the melted 12-HSA from the composition. In one embodiment the method is performed by heating the xerogel and adsorbed material to a temperature above 80° C., which causes the 12-HSA to melt. The 12-HSA can be extracted using several methods, including solid phase extraction and methyl chloride extraction. This environmentally benign gelator makes this technology one of the greenest technologies to contain and remove spilled oil from the environment.

EXAMPLES

Example 1

Preparation of Xerogel Compositions

The samples were prepared in 10 mL vials by adding 0.125 g of 12-hydroxy-stearic acid (12-HSA) to 5.000 g of the organic solvent that were selected due to their ability to be gelled by 12-HSA and their high volatility at atmosphere pressure. The four organic solvents tested were acetonitrile, pentane, diiodomethane, and diethyl ether.

Each of the vials were then capped then heated to 70° C. (80° C. maximum) for 20 min to allow the 12-HSA to dissolve and to be incorporated into the solvent. Once the 12-HSA was completely integrated into the solvent, the vials were stored at 25° C. for 24 hours allowing the gel to form. An HR-2 hybrid rheometer (TA instruments, New Castle, Del.) was used to probe the macroscopic properties of the gels. A 8 mm flat serrated parallel plate (Ta instrument, New Castle, Del.) was used to early out the oscillatory measurements. Small deformation oscillatory rheology was employed to determine the complex G' and G" within the linear viscoelastic region (LVR) of the gel at 1 Hz by carrying out a stress sweeps 10 to 500 Pa. The organogels had a higher elastic modulus than loss modulus (acetonitrile G'=252, 940±14,918 Pa, G"=43,124±4.564 Pa; and pentane G'=322, 000±19,312 Pa; G"=51,462±9,414 Pa) indicating that the materials were gels.

After organogelation, the vials were uncapped at atmospheric pressure for 72 hours (e.g. at least 24 hours) and weighed to ensure that the solvent had evaporated. Upon evaporation, resulting in the transformation of the organogel to a xerogel, the elastic modulus increased drastically (acetonitrile G'=620,629±32,829 Pa; G"=47,107±5.919 Pa; pentane G'=502, 600±11,142 Pa; G"=42,662±4,328 Pa). Samples were stored below the melting point (~60 and 65° C.) of the xerogel in an incubator set at 40° C.

Figure 2:
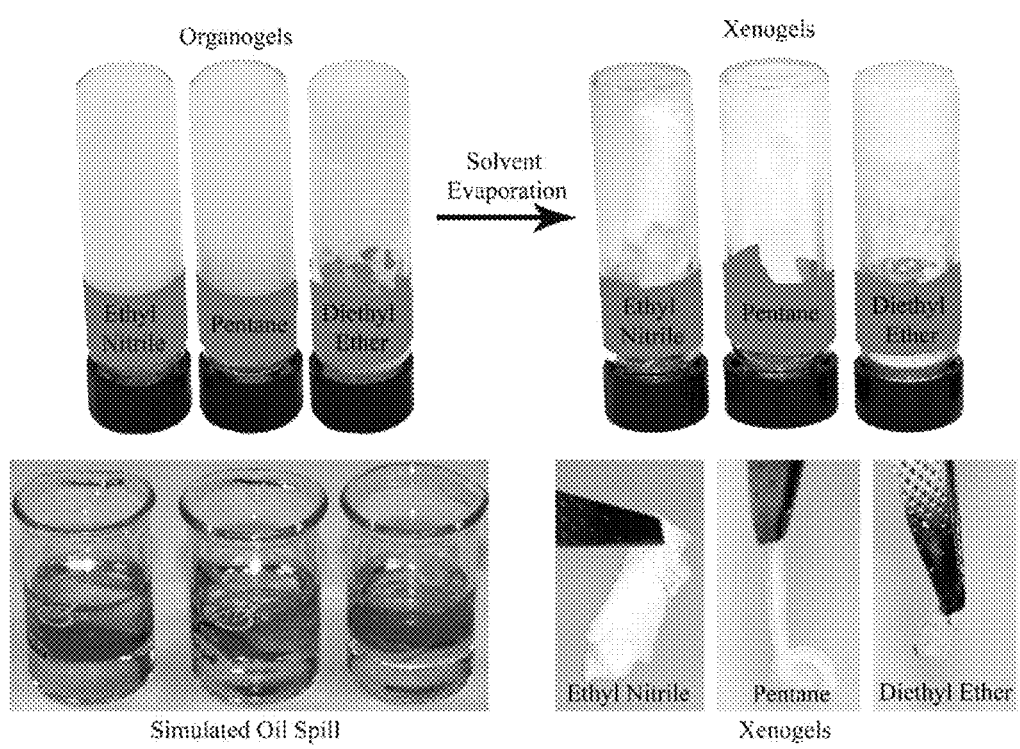
FIG. 2 provides photographic images of organogels produced in three different solvents and the resulting xerogels after 72 hours of drying.

Depending upon solvent volatility, the rate that the gels dried varied greatly and affected the structure of the xerogel. As seen in FIG. 2, acetonitrile (ethyl nitrile) had very little collapse in the structure maintaining a large volume, while pentane and diethyl ether collapsed into very dense xerogels which can be correlated to the differences in the microstructure and ultimately differences in the nanostructure of the crystalline phase.

Example 2

Oil Spill Simulation

Two different set ups were used to simulate the oil spill. The first utilized 10 mL beakers each containing 3 g of distilled water and 3 g of 10W-40 motor oil. The second utilized 3 g of sterile sea water obtained (Sigma Aldrich, lot 076k8431) and 3 g of diesel fuel (Exxon Mobile) or 3 g of regular gasoline (87 octane, Exxon Mobile). The mass of the oil/fuel, water, and beaker system were then weighed and recorded. A known amount of xerogel was placed onto the top of a simulated oil spill and left quiescent for one hour, after which time the sample was removed and blotted dry using Kimwipes® to remove residual surface oil. To obtain the kinetics of adsorption, gels were removed from the beaker, and the weight of the gels were recorded every min for the first 5 min, every 5 min from 5 to 30 min and then every 15 min from 30 min to 1 hour for the 10W-40 motor oil in distilled water. From this data, the mass of the oil absorbed from the different gels could be calculated and the information was used to calculate the percent of oil absorbed with respect to the mass of the xerogel. A second set of experiments determined the amount of diesel or gasoline adsorbed by the gel from sea water after 60 min and is presented as a % weight change of the xerogel.

Figure 3:
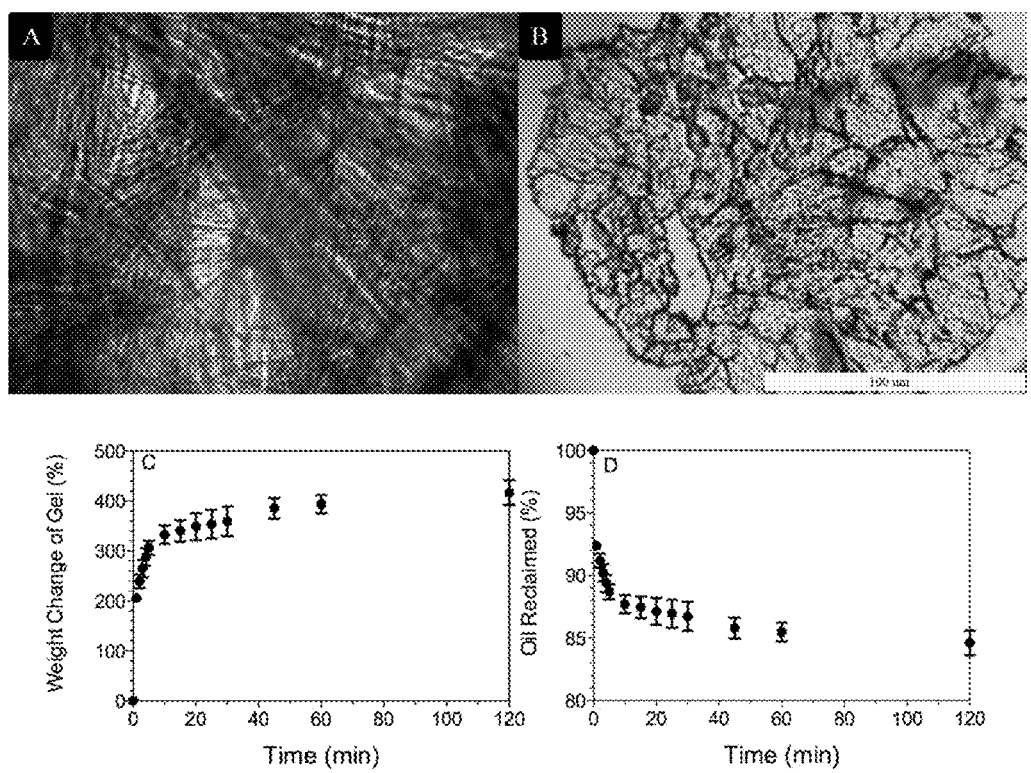
FIG. 3 provides light micrographs of the 12-HSA acetonitrile organogel (A) and 12-HSA xerogel (B) produced from the 12-HSA acetonitrile organogel. The weight gain in the simulated oil spill versus time (C) and (D) oil recovered from the exposure of 0.1 g of xerogel to 3 g of spilled oil.

The mass gained after 1 hour (FIG. 3) was measured to see if the capillary forces were sufficient to draw the hydrophobic solvent into the empty pores of the xerogels. The 12-HSA xerogel produced from diethyl ether did not adsorb solvent during the experiment, the xerogel produced using pentane increased its mass by 93±9.2% while the xerogel made from 12-HSA in acetonitrile increased its mass by 387±21% in distilled water and 10W-40 motor oil (FIG. 3). To ensure that the mass gained was from oil and not water, the 12-HSA xerogel produced using acetonitrile was placed in water. The mass gained after 1 hr was only 3.85±0.5% in distilled water and 5.23±1.2% in seawater, effectively demonstrating that the xerogel was phase selective in adsorbing the oil.

Samples for microscopy were placed on a 25×75×1 mm glass slide and a cover slip was applied to the sample (Fisher Scientific, Pittsburgh, Pa., USA) after being heated to 80° C. Samples were imaged on a Linkham microscope (Linkham Scientific Instruments, Surrey, UK) with a 10× objective lens (N.A. 0.25). A CCD color camera (Olympus, Pa., USA) acquired images as uncompressed 8-bit (256 greys) grayscale TIFF files with a 1280×1024 spatial resolution.

The x-ray diffraction (XRD) or wide-angle x-ray scattering (WAXS) patterns of 12-HSA gels in different solvents were obtained by use of a Bruker HiStar area detector and an Enraf-Nonius FR571 rotating anode x-ray generator equipped with Rigaku Osmic mirror optic system (~0.06 deg 2q nominal dispersion for Cu Ka; l=1.5418 Å) operating at 40 kV and 40 mA. All of the data were collected at room temperature over a period of about 300 sec. The sample to detector distance was 10.0 cm and the standard spatial calibration was performed at that distance. Scans were 4 degrees wide in omega (w) with fixed detector, or Bragg, angle (2q) of 0 deg, and fixed platform (f and c) angles of 0 and 45 deg, respectively. In all cases, the count rate for the area detector did not exceed 100,000 cps.

An AR-G2 hybrid rheometer (TA instruments, New Castle, Del.) was used to probe the macroscopic properties of the gels. An 8 mm flat serrated parallel plate (Ta instrument, New Castle, Del.) was used to carry out the oscillatory measurements. Small deformation oscillatory rheology was employed to determine the complex G' and G" within the linear viscoelastic region (LVR) of the gel at 1 Hz by carrying out a stress sweeps 10 to 500 Pa.

Figure 4:
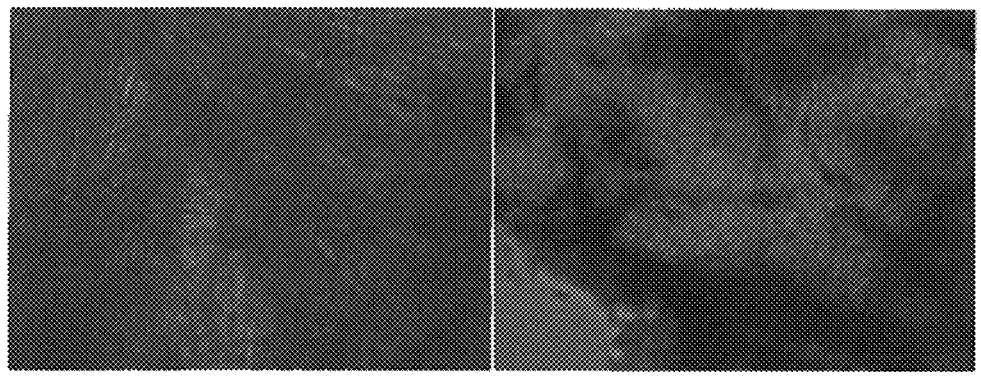
FIG. 4 is a microscopic image of an acetonitrile organogel before solvent evaporation (left) and after (right) solvent evaporation.
Figure 5:
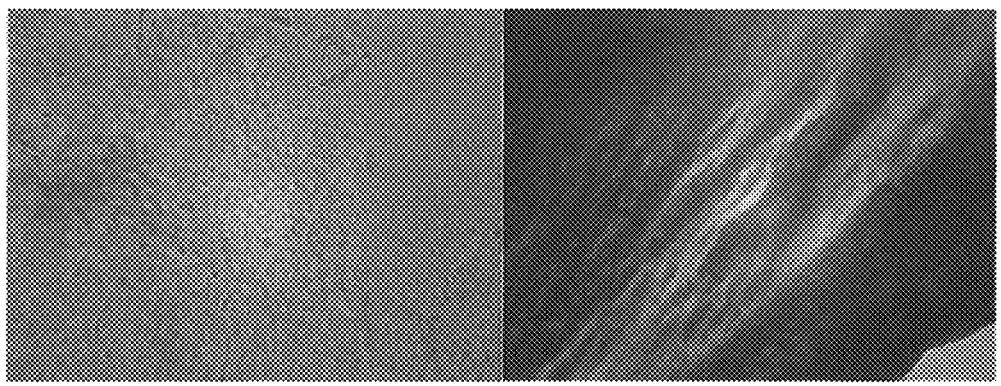
FIG. 5 is a microscopic image of a pentane organogel before solvent evaporation (left) and after (right) solvent evaporation.
Figure 6:
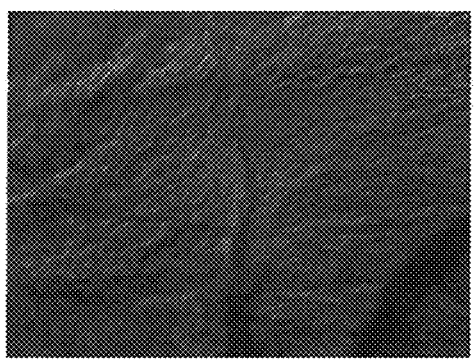
FIG. 6 is a microscopic image of diethyl ether organogel after solvent evaporation.
Figure 7:
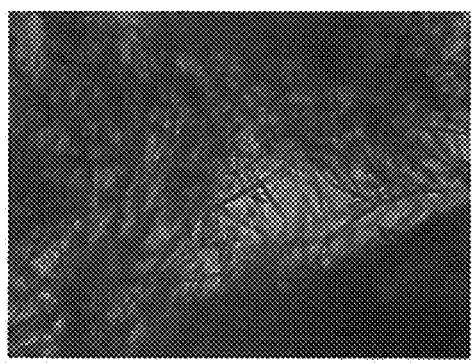
FIG. 7 is a microscopic image of diiodomethane organogel before solvent evaporation.
Figure 8:
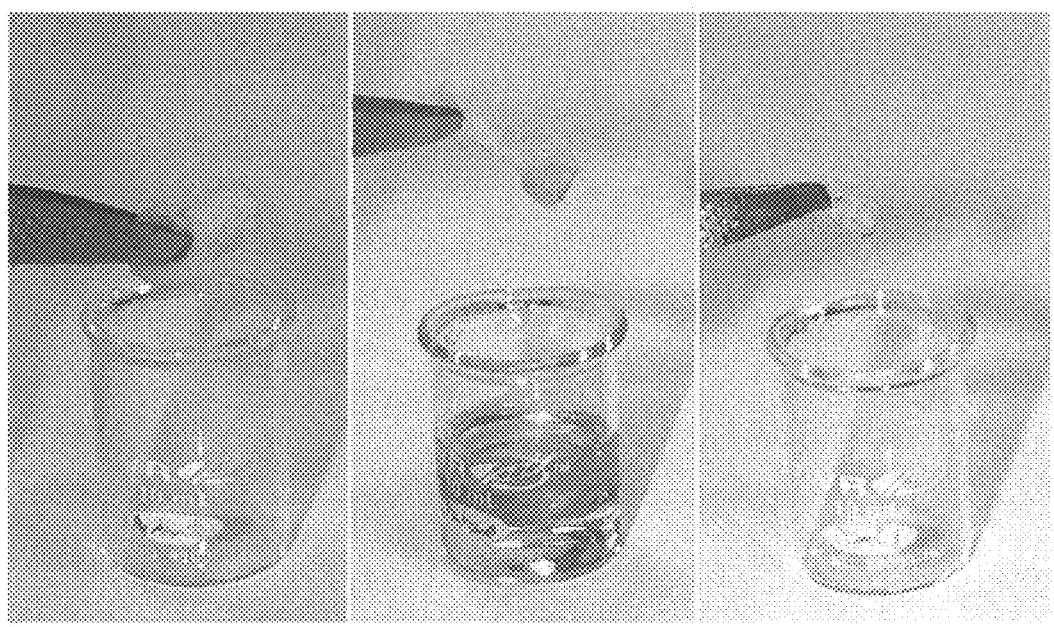
FIG. 8 provides photographic images (left to right) of acetonitrile, pentane, and diethyl ether xerogels after being removed from a simulated oil spill.

FIGS. 4 and 5 display the acetonitrile and pentane xerogels both before and after matrix oil absorption, respectively. FIG. 6 shows the diethylether organogel after evaporation and FIG. 7 shows the diiodomethane organogel before evaporation. Only the acetonitrile and pentane samples have microscopy images both before and after solvent evaporation. However, the diethyl ether organogel did not form until after solvent evaporation and diiodomethane solvent was not able to sufficiently evaporate from the organogel. FIG. 8 displays the physical properties of the acetonitrile, pentane, and diethyl ether xerogels after being removed from the oil spill.

As demonstrated by the results presented in Table 1, the acetonitrile xerogel had the greatest oil absorption percentage both in the first and the second trials of the experiment.

TABLE 1

Oil absorption percentage and mass data for each of the organogel.

| Type of organogel & organic solvent used | Mass of gel before Oil Spill | Mass of oil, water & beaker | Mass of gel after oil | Mass of oil adsorbed | % of oil adsorbed with respect to mass of the gel |
|---|---|---|---|---|---|
| Acetonitrile (1st trial) | 0.0715 g | 13.68 g | 0.3376 g | 0.2661 g | 372.17% |
| Acetonitrile (2nd trial) | 0.0881 g | 13.6857 g | 0.4435 g | 0.3554 g | 403.41% |
| Pentane (1st trial) | 0.0472 g | 14.1969 g | 0.0888 g | 0.0418 g | 87.47% |
| Pentane (2nd trial) | 0.1261 g | 14.0944 g | 0.2561 g | 0.13 g | 103.09% |
| Diethyl Ether | 0.0384 g | 13.7509 | NA | NA | NA |
| Diiodmethane | NA | 13.4759 g | NA | NA | NA |

In addition, the acetonitrile xerogel was found to be hydrophobic after careful testing. When placed in water without oil, only a very minuscule amount of water was displaced. It was noted that water can only adhere to the surface of the gel. Table 2 displays the results of the acetonitrile xerogel exposed to water without oil.

TABLE 2

2.5% Acetonitrile(0.125 g of HSA + 5 g of Acetonitrile) in water without oil

| Mass of gel before water | Mass of water and beaker | Mass of gel after water solution | Mass of water displaced | % of water displaced |
|---|---|---|---|---|
| 0.1117 g | 15.3702 g | 0.1160 g | .0043 g | 3.85% |

The 12-HSA xerogel, made using acetonitrile as the solvent, was also tested on diesel in seawater and regular gasoline in seawater. After exposure for 1 hour of the xerogel to the simulated spill the xerogel increased in weight by 459±33 wt % in diesel and 583±42 wt % in gasoline. This illustrates that the 12-HSA xerogel is not only effective but also very versatile in its applications of reclaiming spilled oil. It has previously been shown that silica aerogels are far less effective (~0.1 wt % gain) than 12-HSA xerogels wt % gain).

Because the 12-HSA xerogel produced from acetonitrile outperformed the other xerogels, their organogel and xerogel were imaged illustrating the long aspect ratio fibers and the fibrous structure was maintained in the xerogel (FIG. 3). It is obvious from the weight gained and oil recovered that the xerogels made from 12-HSA and acetonitrile are very effective phase selective sorbent materials. The major advantage of utilizing the xerogel as opposed to forming an organogel in the environment is that this system is not dependent on environmental factors. When the material of interest is apolar the present sorbent xerogel pellets described herein will be an effective mode to contain and remove the materials from the environment. Furthermore, 12-HSA, the only material remaining in the xerogel is biodegradable, a natural component of castor seed oil, and will not further stress the environment.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

What is claimed is:

1. A xerogel consisting essentially of 12-hydroxy-stearic acid (12-HSA), said xerogel characterized by a spherulitic fibrillar network structure, wherein said network structure is established in an acetonitrile molecular 12-HSA gel.

2. The xerogel of claim 1, wherein said network structure is substantially free from acetonitrile solvent.

3. The xerogel of claim 1, which bears empty pores to adsorb an apolar liquid in an aqueous medium.

4. The xerogel of claim 1, which is selective in adsorbing oil than water.

5. The xerogel of claim 1, wherein said network structure is prepared by dissolving 12-HAS in acetonitrile, allowing a gel to form, and removing the acetonitrile solvent.

6. The xerogel of claim 5, wherein the amount of 12-HAS ranges from about 0.5 wt % to about 15 wt % in the acetonitrile solution.

7. The xerogel of claim 5, wherein said network structure maintains substantially the same volume after removal of the solvent.

8. The xerogel of claim 5, wherein the formation of said network structure is independent of environmental factors.

* * * * *